US009646475B2

(12) United States Patent
Tanner

(10) Patent No.: US 9,646,475 B2
(45) Date of Patent: May 9, 2017

(54) PROTECTIVE COVER AND ALARM SYSTEM FOR A LATCHING SYSTEM

(71) Applicant: Jon M. Tanner, Carefree, AZ (US)

(72) Inventor: Jon M. Tanner, Carefree, AZ (US)

( * ) Notice: Subject to any disclaimer, the term of this patent is extended or adjusted under 35 U.S.C. 154(b) by 35 days.

(21) Appl. No.: 14/640,880

(22) Filed: Mar. 6, 2015

(65) Prior Publication Data

US 2016/0260308 A1    Sep. 8, 2016

(51) Int. Cl.
*B60R 22/48* (2006.01)
*G08B 21/02* (2006.01)
*A44B 11/25* (2006.01)

(52) U.S. Cl.
CPC .......... *G08B 21/02* (2013.01); *A44B 11/2576* (2013.01); *B60R 22/48* (2013.01); *G08B 21/0288* (2013.01); *B60R 2022/4808* (2013.01); *Y10T 24/45005* (2015.01); *Y10T 24/45079* (2015.01)

(58) Field of Classification Search
CPC .................................................. A44B 11/2576
See application file for complete search history.

(56) References Cited

U.S. PATENT DOCUMENTS

| | | |
|---|---|---|
| 4,675,954 A | 6/1987 | Gullickson |
| 4,731,912 A * | 3/1988 | Boriskie ............ A44B 11/2576 24/487 |
| 6,431,652 B1 * | 8/2002 | Kennedy ............ A44B 11/2576 297/464 |
| 6,769,157 B1 | 8/2004 | Meal |
| 6,809,640 B1 | 10/2004 | Sherman |
| 6,853,298 B1 | 2/2005 | Stojanowski |
| 7,243,403 B2 | 7/2007 | Hoffman |
| 7,758,118 B1 | 7/2010 | Good, Jr. |
| 8,677,577 B2 | 3/2014 | McGlynn |
| 8,816,839 B1 | 8/2014 | Rick |
| 2011/0083304 A1 | 4/2011 | Allison, Jr. |
| 2012/0316659 A1 | 12/2012 | Magas |

FOREIGN PATENT DOCUMENTS

| | | |
|---|---|---|
| GB | 2417285 | 2/2006 |
| GB | 2497270 | 6/2013 |
| WO | WO2009041939 | 4/2009 |
| WO | WO2012003002 | 1/2012 |

\* cited by examiner

*Primary Examiner* — Benyam Haile
(74) *Attorney, Agent, or Firm* — Weiss & Moy, P.C.; Jeffrey D. Moy

(57) ABSTRACT

A protective cover for a buckle of a latching system has a base plate having a base plate retaining area for housing the buckle. A cover is hingly coupled to the base plate and has a cover retaining area for housing the buckle when the cover is closed onto the base plate. A locking mechanism is provided for securing the cover to the base plate. An alarm circuit is housed within the base plate for sending an alarm signal when the cover is unlocked and opened prior to deactivating the alarm circuit.

10 Claims, 6 Drawing Sheets

PROTECTIVE COVER AND ALARM SYSTEM FOR A LATCHING SYSTEM

FIELD

The present application generally relates to a child belt latching system, and, more particularly, to a protective cover and alarm system that may be used to prevent a child from unlocking the buckle on a latching system and which activates an alarm if the protective cover is not properly unlocked.

BACKGROUND

Child protective latching systems (hereinafter latching systems) are often used in many children devices such as high chairs, car seats, strollers, shopping carts and the like to secure the child in the device. The latching systems used in these child devices may include simple two point lap belts, 3-prong systems, 3-point "Y" shape belts, 4 or 5 point harness systems, and the like. Each of the aforementioned latching systems generally has a locking mechanism. The locking mechanism may be comprised of a buckle which may be positioned on a distal end of at least one belt member and one or more locking tabs positioned on a distal end of one or more different belt members. To lock the latching system, one generally inserts the locking tab into the buckle. To unlock the latching system, one may press one or more release buttons on the buckle. The release button may be a separate button located on the buckle that releases the locking tab from the buckle. Alternatively, portions of the locking tab may protrude out from the buckle and may need to be pressed inwards to release the locking tab from the buckle.

Both the release button and the portions of the tabs that extend out of the buckle are generally accessible to the child when the child is properly restrained in the child device by the latching system. Thus, children may be capable of intentionally or inadvertently pressing the release button or the protruding tab on the buckle and unlock the latching system. This can be extremely dangerous in that the child can endure harm if not properly restrained, especially if an adult supervising the child is unaware that the child has become unrestrained.

Presently, there are protective covers that may be positioned over the buckle of the latching system. However, these buckles provide no indication to one watching the child if the protective cover has been opened by the child. Thus, a child may still be able to remove the protective cover and unlock the latching system without anyone knowing. Further, present protective covers are only designed for specific buckle types and are not interchangeable with different types of buckles. For example, while present protective covers may be used for a two point latching systems, they are not designed to be used with a 3 prong latching systems or a 4 or 5 point harness system.

Therefore, it would be desirable to provide a system and method that overcome the above identified concerns, as well as additional challenges which will become apparent from the disclosure set forth below.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a protective cover for a buckle of a latching system is disclosed. The protective cover has a base plate having a base plate retaining area for housing the buckle. A cover is hingly coupled to the base plate and has a cover retaining area for housing the buckle when the cover is closed onto the base plate. A locking mechanism is provided for securing the cover to the base plate. An alarm circuit is housed within the base plate for sending an alarm signal when the cover is unlocked and opened prior to deactivating the alarm circuit.

In accordance with one aspect of the present application, a protective cover for a buckle of a latching system is disclosed. The protective cover has a base plate. A cover is movably coupled to the base plate, the buckle housed within the base plate and cover when the cover is closed onto the base plate. A locking mechanism is used for securing the cover to the base plate. An alarm circuit is housed within the base plate for sending an alarm signal when the cover is unlocked and opened prior to deactivating the alarm circuit.

In accordance with one aspect of the present application, a protective cover for a buckle of a latching system is disclosed. The protective cover has a base plate having a base plate retaining area for housing the buckle. A cover is coupled to the base plate and has a cover retaining area for housing the buckle when the cover is closed onto the base plate. A gap is formed between the base plate and the cover when the cover is closed onto the base plate. A hinge mechanism is coupled to the cover and the base plate. A locking mechanism is provided for securing the cover to the base plate. The locking mechanism has at least one "L" shaped tab member extending from a bottom section of the cover. A corresponding slot is formed in the base plate and has a lip member positioned in the slot to engage a bottom leg of the "L" shaped tab member when the "L" shaped tab member is inserted into the corresponding slot. An alarm circuit is housed within the base plate for sending an alarm signal when the cover is unlocked and opened prior to deactivating the alarm circuit.

BRIEF DESCRIPTION OF THE DRAWINGS

Embodiments of the disclosure will become more fully understood from the detailed description and the accompanying drawings, wherein.

DESCRIPTION OF THE APPLICATION

Figure 1:
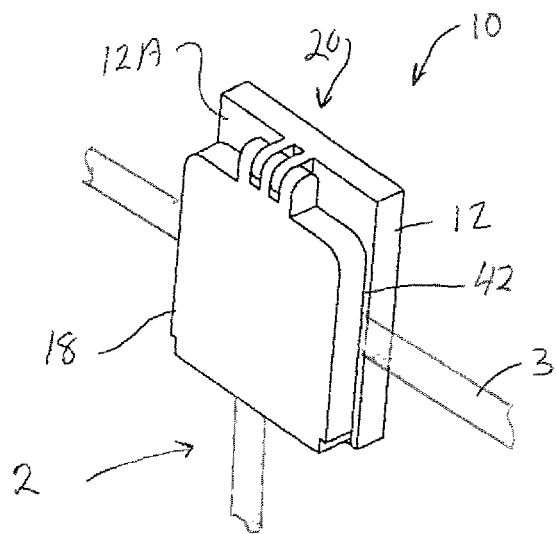
FIG. 1 is a perspective view of a buckle protective cover in a closed positioned in accordance with one aspect of the present application.
Figure 2:
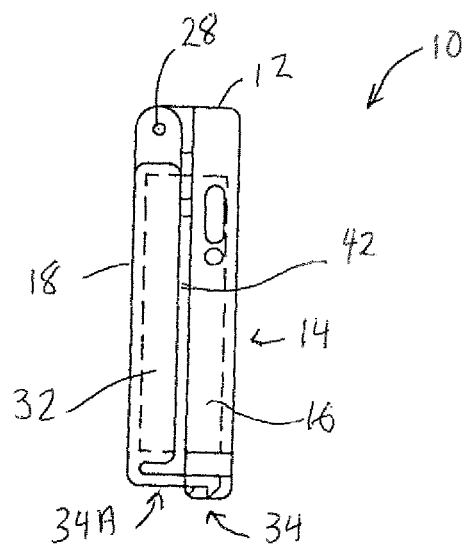
FIG. 2 is a side view of the buckle protective cover of FIG. 1 in the closed positioned in accordance with one aspect of the present application.
Figure 3:
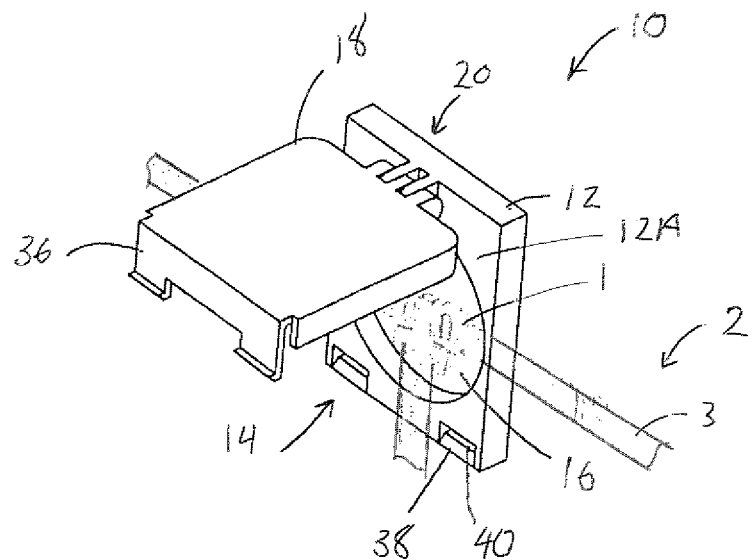
FIG. 3 is a perspective view of the buckle protective cover of FIG. 1 in an open positioned in accordance with one aspect of the present application.
Figure 4:
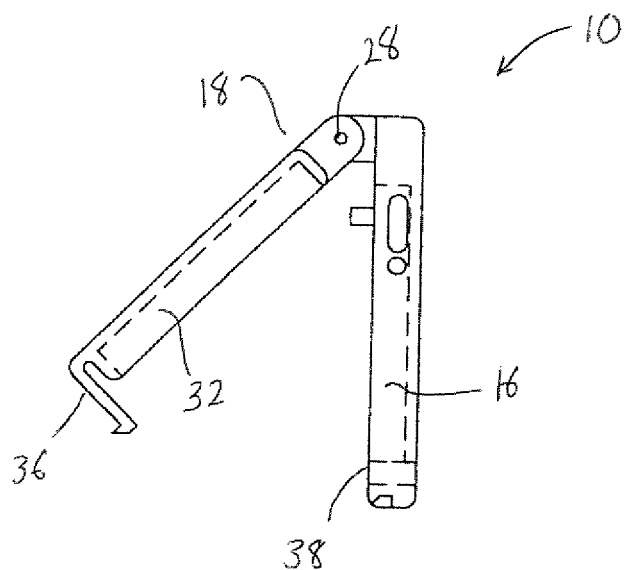
FIG. 4 is a side view of the buckle protective cover of FIG. 1 in the open positioned in accordance with one aspect of the present application.
Figure 5:
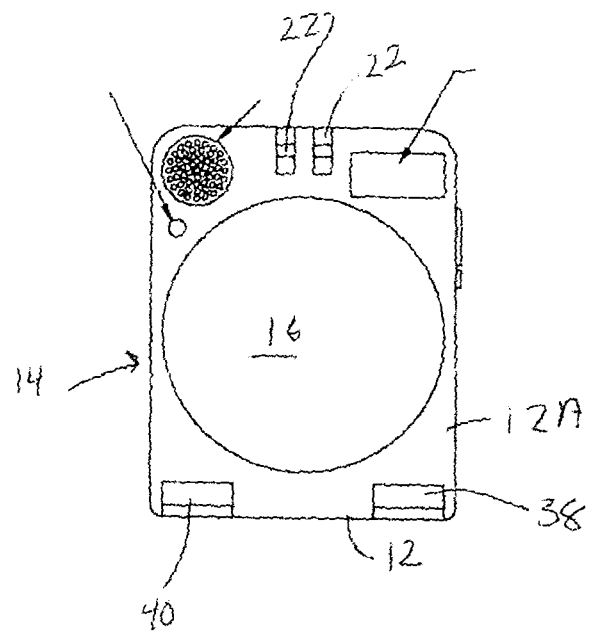
FIG. 5 is a front view of the base section of the buckle protective cover depicted in FIG. 1 in accordance with one aspect of the present application.
Figure 6:
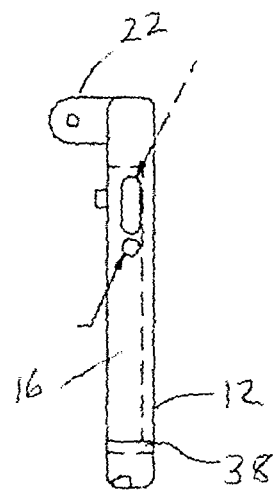
FIG. 6 is a side view of the base section of the buckle protective cover depicted in FIG. 1 in accordance with one aspect of the present application.
Figure 7:
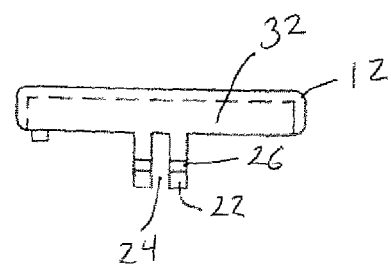
FIG. 7 is a top view of the base section of the buckle protective cover depicted in FIG. 1 in accordance with one aspect of the present application.
Figure 8:
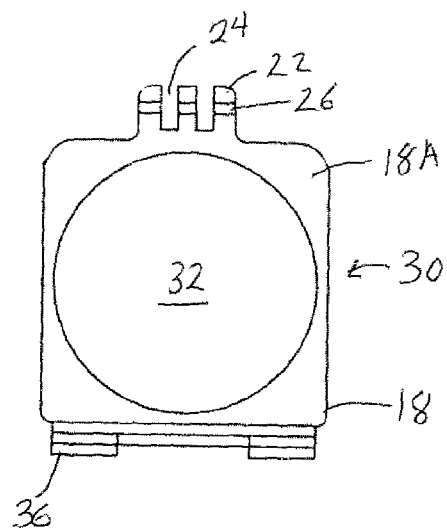
FIG. 8 is a interior front view of the cover section of the buckle protective cover depicted in FIG. 1 in accordance with one aspect of the present application.
Figure 9:
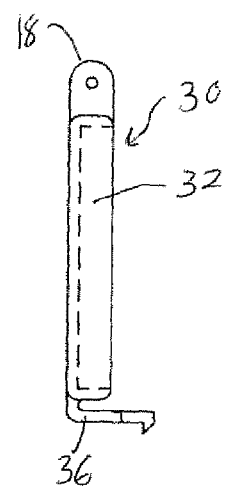
FIG. 9 is a side view of the cover section of the buckle protective cover depicted in FIG. 1 in accordance with one aspect of the present application.
Figure 10:
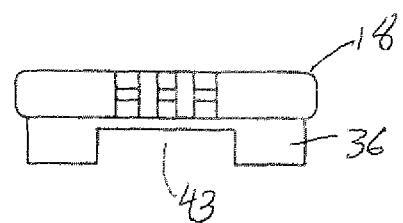
FIG. 10 is a top view of the cover section of the buckle protective cover depicted in FIG. 1 in accordance with one aspect of the present application.
Figure 11:
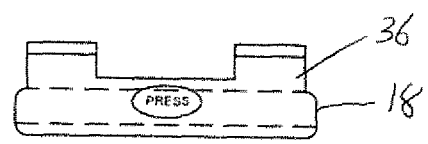
FIG. 11 is a bottom view of the cover section of the buckle protective cover depicted in FIG. 1 in accordance with one aspect of the present application.
Figure 12:
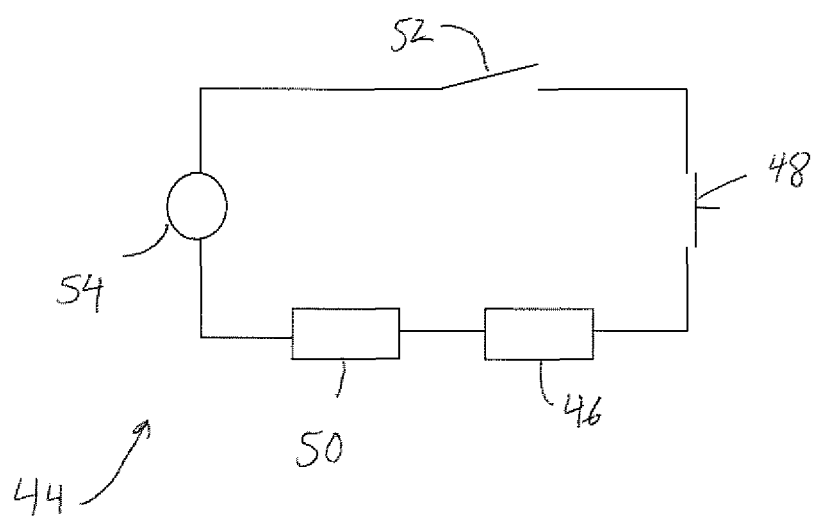
FIG. 12 is a block diagram of the alarm circuit used in the buckle protective cover depicted in FIG. 1 in accordance with one aspect of the present application.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Referring to the FIGS., an exemplary buckle protective cover 10 (hereinafter protective cover 10) is shown. The protective cover 10 may be used to prevent access to a buckle 1 of a latching system 2. The protective cover 10 may provide an alarm signal if the protective cover 10 is not properly opened. Thus, even if a child is able to open the protective cover 10, an alarm signal may be activated notifying one of the unauthorized opening. While the protective cover 10 is shown being used with a three (3) prong latching system 2, the protective cover 10 may be used other type of latching system 2.

The protective cover 10 may have a base member 12. The base member 12 may be formed of a lightweight but sturdy material such as plastic materials like polyethylene terephthalate (PET), polypropylene (PP), polyvinyl chloride (PVC) and the like. The aforementioned plastic materials are not only sturdy and lightweight but also tend not to absorb heat as much as metal materials such as aluminum, tin and the like.

In the present embodiment, the base member 12 is square in shape. However, this is shown as an example and should not be seen in a limiting manner. The base member 12 may be formed of other geometric shapes without departing from the spirit and scope of the present invention.

The base member 12 may have a retaining area 14 formed on a front surface 12A of the base member 12. The retaining area 14 may be used for housing the buckle 1 of the latching system 2. In the present embodiment, the retaining area 14 may be a recessed area 16. In the present embodiment shown in the FIGS., the recessed area 16 is circular in shape. However, this is only shown as an example and should not be seen in a limiting manner. The recessed area 16 may be formed of other geometric shapes without departing from the spirit and scope of the present invention.

The retaining area 14 may be formed in other manners without departing from the spirit and scope of the present invention. For example, in accordance with another embodiment of the present invention, the retaining area 14 may be formed of a ridge member that extends upward from the front surface 12A of the base member 12. The ridge member may form a cavity for housing the buckle 1.

The protective cover 10 may have a cover member 18. The cover member 18 may be formed of the same material of the base member 12. The cover member 18 may be coupled to the base member 12. A hinge mechanism 20 may be used to couple the cover member 18 to the base member 12. The hinge mechanism 20 may be a separate hinge device used to connect the cover member 18 to the base member 12. Alternatively, as shown in the FIGS., the hinge mechanism 20 may be integrally formed on the cover member 18 to the base member 12.

In accordance with one embodiment, if the hinge mechanism 20 is integrally formed on the cover member 18 to the base member 12, both the cover member 18 to the base member 12 may have a plurality of tab members 22. The tab members 22 may be spaced apart to form a gap 24 between adjacent tab members 22. The gap 24 may be of a sufficient width to allow tab members 22 from the cover member 18 to fit in-between tab members 22 of the base member 12.

Each tab member 22 may have an opening 26 formed there through. When the tab members 22 are aligned so that tab members 22 from the cover member 18 fit in-between tab members 22 of the base member 12, the openings 26 of the tab members 22 may be aligned to allow a pin 28 to be positioned there through. The pin 28 may be used to allow the cover member 18 to pivot relative the base member 12 about the pin 28.

The cover member 18 may have a retaining area 30 formed on a rear surface 18A of the cover member 12. The retaining area 30 may be used for housing the buckle 1 of the latching system 2 when the cover member 18 is positioned. In the present embodiment, the retaining area 30 may be a recessed area 32. In the present embodiment shown in the FIGS., the recessed area 32 is circular in shape. However, this is only shown as an example and should not be seen in a limiting manner. The recessed area 32 may be formed of other geometric shapes without departing from the spirit and scope of the present invention.

The retaining area 30 may be formed in other manners without departing from the spirit and scope of the present invention. For example, in accordance with another embodiment of the present invention, the retaining area 30 may be formed of a ridge member that extends upward from the rear surface 18A of the cover member 18. The ridge member may form a cavity for housing the buckle 1. The ridge member forming the retaining area 30 may be configured to fit around or within the retaining area 14 formed by the ridge member extending upward from the front surface 12A of the base member 12.

The protective cover 10 may have a securing mechanism 34. The securing mechanism 34 may be used to secure the cover member 18 to the base member 12. In accordance with the embodiment depicted in the FIGS., the securing mechanism 34 may be a latching device 34A. The latching device 34A may be comprised of one or more "L" shaped member 36 and one or more corresponding slots 38. The "L" shaped member 36 may be formed on a bottom edge 18B of the cover member 18. The "L" shaped member 36 may be configured so that a bottom leg of the "L" shaped member 36 slid into and engage lip member 40 formed in the slot 38 thereby locking the cover member 18 to the base member 12. To unlock the latching device 34A, one may press on a center area on the bottom edge 18B. By pressing and applying pressure on the center area on the bottom edge 18B, the bottom edge 18B may bend slightly upward allowing the "L" shaped members 36 to disengage from the lip member 40. This may allow the user to pull the L" shaped members 36 out of the slot 38 thereby unlocking the cover member 18 from the base member 12.

In the locked position, a gap 42 may be formed between the cover member 18 and the base member 12. The gap 42 may be formed along opposing side surfaces of the protective cover 10. The gap may further extend to a top surface of the protective cover 10. The gap 42 may be of sufficient size to allow a belt 3 of the latching system 2 to be positioned between the cover member 18 and the base member 12. A slot 43 may be formed in a center area of the bottom edge 18B of the cover member 18. The slot 43 may be dimensioned used to allow a belt 3 of the latching system 2 to fit there between.

When the latching system 2 is properly locked, the buckle 1 may be positioned within the retaining area 14 of the base member 12. The cover member 18 may be closed and locked housing the buckle 1 within the retaining area 14 of the base member 12 and the retaining area 30 of the cover member 18. The belts 3 of the latching system 2 may be positioned in the gap 42 formed between the cover member 18 and the base member 12 and/or the slot 42 formed in the center area of the bottom edge 18B of the cover member 18.

The protective cover 10 may have an alarm circuit 44. The alarm circuit 44 may be designed to activate an alarm signal when the cover member 18 is not properly unlocked from and the base member 12. The alarm circuit 44 may be housed within the base member 12. The alarm circuit 44 may have a control unit 46. The control unit 46 may be coupled to a contact 48, a speaker 50 and a switch 52. The alarm circuit 44 may be powered by a power source 54 such as a batter or the like. When the alarm circuit 44 is activated by moving the switch 52 to an "ON" position, the alarm circuit 44 will send an alarm signal through the speaker 50 indicating when the cover member 18 is unlocked from and the base member 12. The alarm signal sent to the speaker 50 may be a soothing sound such as a lullaby song or the like in order to not scare the child.

In accordance with one embodiment, the switch 52 may be slightly recessed within the base member 12. By having the switch 52 slightly recessed within the base member 12, a child may not have the dexterity to move the switch 52 within the recessed section thereby preventing the child from deactivating the alarm circuit 44.

In accordance with one embodiment, the contact 48 may be a spring loaded contact 48A. The spring loaded contact 48A may be a normally opened contact. When the alarm circuit 44 is activated by moving the switch 52 to "ON" and the cover member 18 is closed and locked to the base member 12, the spring loaded contact is an open contact thereby preventing activation of the alarm circuit 44. If the cover member 18 is unlocked and opened prior to the switch 52 being moved to the "OFF" position, the spring loaded contact 48A will close the alarm circuit 44 sends an alarm signal through the speaker 50 indicating when the cover member 18 is unlocked from and the base member 12.

In accordance with one embodiment, the alarm circuit 44 may have a wireless transmitter. The wireless transmitter may be used to send a signal to a receiver. The receiver may be in a separate receiving base unit or a mobile electronic device. If the cover member 18 is unlocked and opened prior to the switch 52 being moved to the "OFF" position, the alarm circuit 44 sends an alarm signal through the speaker 50 indicating when the cover member 18 is unlocked from and the base member 12 and sends a wireless signal to the separate receiving base unit and/or a mobile electronic device indicating the same.

The foregoing description is illustrative of particular embodiments of the application, but is not meant to be a limitation upon the practice thereof. The following claims, including all equivalents thereof, are intended to define the scope of the application.

What is claimed is:

1. A protective cover for a buckle of a latching system comprising:
   a base plate having a base plate retaining area for housing the buckle;
   a cover movably coupled to the base plate and having a cover retaining area for housing the buckle when the cover is closed onto the base plate;
   a slot formed in a central area of a bottom edge of the cover, the slot dimensioned to allow the latching system to be positioned through the bottom edge of the cover when the cover is closed onto the base plate;
   a gap formed between the base plate and the cover when the cover is closed onto the base plate, the gap formed on opposing side surfaces of the protective cover and dimensioned to allow the latching system to be positioned through the opposing side surfaces of the protective cover when the cover is closed onto the base plate;
   a locking mechanism for securing the cover to the base plate; and
   an alarm circuit housed within the base plate for sending an alarm signal when the cover is unlocked and opened prior to deactivating the alarm, wherein the alarm circuit comprises:
   a power source;
   a controller coupled to the power source;
   a speaker coupled to the controller;
   a contact coupled to the controller, wherein opening the cover causes the contact to close the alarm circuit allowing an alarm signal to be sent to the speaker when the alarm circuit is activated; and
   a switch coupled to the controller to activate and deactivate the alarm circuit, wherein the switch is recessed within the base plate;
   wherein the alarm circuit wirelessly transmits an alarm signal to a wireless electronic device.

2. The protective cover of claim 1, wherein the locking mechanism comprises:
   at least one "L" shaped tab member extending from a bottom section of the cover; and
   a corresponding slot formed in the base plate and having a lip member positioned in the slot to engage a bottom leg of the "L" shaped tab member when the "L" shaped tab member is inserted into the corresponding slot.

3. The protective cover of claim 1, comprising a hinge mechanism to movably couple the cover to the base plate.

4. The protective cover of claim 3, wherein the hinge mechanism is integral to the cover and the base plate.

5. A protective cover for a buckle of a latching system comprising:
   a base plate;
   a cover movably coupled to the base plate, the buckle housed within the base plate and cover when the cover is closed onto the base plate;
   a slot formed in a bottom edge of the protective cover, the slot dimensioned to allow the latching system to be positioned through the bottom edge of the protective cover when the cover is closed onto the base plate;

a gap formed on opposing side surfaces of the protective cover when the cover is closed onto the base plate, the gap formed on opposing side surfaces of the protective cover dimensioned to allow the latching system to be positioned through the opposing side surfaces of the protective cover when the cover is closed onto the base plate;

a locking mechanism for securing the cover to the base plate; and an alarm circuit housed within the base plate for sending an alarm signal when the cover is unlocked and opened prior to deactivating the alarm circuit, wherein the alarm circuit comprises:

a power source;

a controller coupled to the power source;

a speaker coupled to the controller;

a contact coupled to the controller, wherein opening the cover causes the contact to close the alarm circuit allowing an alarm signal to be sent to the speaker when the alarm circuit is activated; and a switch coupled to the controller to activate and deactivate the alarm circuit, wherein the switch is recessed within the base plate;

wherein the alarm circuit wirelessly transmits an alarm signal to a wireless electronic device.

6. The protective cover of claim 5, wherein the locking mechanism comprises:

at least one "L" shaped tab member extending from a bottom section of the cover; and a corresponding slot formed in the base plate and having a lip member positioned in the slot to engage a bottom leg of the "L" shaped tab member when the "L" shaped tab member is inserted into the corresponding slot.

7. The protective cover of claim 5, comprising a hinge mechanism to movably couple the cover to the base plate.

8. The protective cover of claim 7, wherein the hinge mechanism is integral to the cover and the base plate.

9. A protective cover for a buckle of a latching system comprising:

a base plate having a base plate retaining area for housing the buckle;

a cover coupled to the base plate and having a cover retaining area for housing the buckle when the cover is closed onto the base plate;

a slot formed in a central area of a bottom edge of the cover, the slot dimensioned to allow the latching system to be positioned through the bottom edge of the cover when the cover is closed onto the base plate;

a gap formed between the base plate and the cover when the cover is closed onto the base plate, the gap formed on opposing side surfaces of the protective cover and dimensioned to allow the latching system to be positioned through opposing side surfaces of the protective cover when the cover is closed onto the base plate;

a hinge mechanism couple to the cover and the base plate;

a locking mechanism for securing the cover to the base plate, wherein the locking mechanism comprises:

at least one "L" shaped tab member extending from a bottom section of the cover; and a corresponding slot formed in the base plate and having a lip member positioned in the slot to engage a bottom leg of the "L" shaped tab member when the "L" shaped tab member is inserted into the corresponding slot; and an alarm circuit housed within the base plate for sending an alarm signal when the cover is unlocked and opened prior to deactivating the alarm circuit, wherein the alarm circuit comprises:

a power source;

a controller coupled to the power source;

a speaker coupled to the controller;

a contact coupled to the controller, wherein releasing the locking mechanism and opening the cover causes the contact to close the alarm circuit allowing an alarm signal to be sent to the speaker when the alarm circuit is activated; and a switch coupled to the controller to activate and deactivate the alarm circuit, the switch recessed within the base plate;

wherein the alarm circuit wirelessly transmits an alarm signal to a wireless electronic device.

10. The protective cover of claim 9, wherein the switch is recessed within the base plate.

* * * * *